United States Patent
Yoshida et al.

(10) Patent No.: US 12,188,769 B2
(45) Date of Patent: Jan. 7, 2025

(54) DEFECT INSPECTION DEVICE AND DEFECT INSPECTION METHOD

(71) Applicant: SHIMADZU CORPORATION, Kyoto (JP)

(72) Inventors: Koki Yoshida, Kyoto (JP); Kenji Takubo, Kyoto (JP); Takahide Hatahori, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 292 days.

(21) Appl. No.: 17/792,405

(22) PCT Filed: Oct. 12, 2020

(86) PCT No.: PCT/JP2020/038469
§ 371 (c)(1),
(2) Date: Jul. 13, 2022

(87) PCT Pub. No.: WO2021/145034
PCT Pub. Date: Jul. 22, 2021

(65) Prior Publication Data
US 2023/0062821 A1    Mar. 2, 2023

(30) Foreign Application Priority Data
Jan. 17, 2020 (JP) ................ 2020-005696

(51) Int. Cl.
*G01B 9/02* (2022.01)
*G01B 9/02098* (2022.01)
(Continued)

(52) U.S. Cl.
CPC ..... *G01B 9/02095* (2013.01); *G01B 9/02098* (2013.01); *G01N 29/041* (2013.01);
(Continued)

(58) Field of Classification Search
CPC .. G01B 9/02; G01B 9/02095; G01B 9/02098; G01N 29/00; G01N 29/04; G01N 29/041;
(Continued)

(56) References Cited

U.S. PATENT DOCUMENTS 7,463,364 B2 * 12/2008 Yacoubian ......... G01N 29/2418
356/502
9,470,623 B2 * 10/2016 Sano ...................... G01N 29/46
(Continued)

FOREIGN PATENT DOCUMENTS

JP     107243846     9/1995
JP     2000088815    3/2000
(Continued)

OTHER PUBLICATIONS

"International Search Report (Form PCT/ISA/210) of PCT/JP2020/038469," mailed on Dec. 22, 2020, with English translation thereof, pp. 1-4.
(Continued)

*Primary Examiner* — Nguyen Q. Ha
(74) *Attorney, Agent, or Firm* — JCIPRNET

(57) ABSTRACT

A defect inspection device (100) includes an excitation unit that excites an elastic wave, an irradiation unit (2) that applies laser lights, a measurement unit (3) that measures the interfered laser lights, and a control unit that acquires vibration state information which is information about a state of the elastic wave excited in an inspection target (P) for a plurality of frequencies by changing a frequency of excitation vibration caused by the excitation unit in order to excite the elastic wave in the inspection target (P), and extracts recommended frequencies (F) recommended for inspecting a defect of the inspection target (P) from among the plurality of frequencies based on the acquired vibration state information for the plurality of frequencies.

11 Claims, 8 Drawing Sheets

(51) Int. Cl.
  *G01N 29/04*  (2006.01)
  *G01N 29/12*  (2006.01)
  *G01N 29/44*  (2006.01)

(52) U.S. Cl.
  CPC ........... *G01N 29/043* (2013.01); *G01N 29/12* (2013.01); *G01N 29/4454* (2013.01); *G01N 2291/014* (2013.01); *G01N 2291/0234* (2013.01); *G01N 2291/0289* (2013.01); *G01N 2291/262* (2013.01)

(58) Field of Classification Search
  CPC .. G01N 29/043; G01N 29/12; G01N 29/4454; G01N 2291/014; G01N 2291/0234; G01N 2291/0289; G01N 2291/262
  See application file for complete search history.

(56) References Cited

U.S. PATENT DOCUMENTS

| | | |
|---|---|---|
| 2016/0375272 A1 | 12/2016 | Tsubuku et al. |
| 2017/0164974 A1 | 6/2017 | Tsubuku et al. |
| 2017/0350690 A1 | 12/2017 | Hatahori et al. |
| 2019/0204275 A1 | 7/2019 | Hatahori et al. |
| 2022/0026396 A1* | 1/2022 | Hatahori ................ G01N 21/88 |

FOREIGN PATENT DOCUMENTS

| | | |
|---|---|---|
| JP | 2002055092 | 2/2002 |
| JP | 2014226318 | 12/2014 |
| JP | 2017219318 | 12/2017 |
| WO | WO2015122308 | 8/2015 |
| WO | 2017221324 | 12/2017 |

OTHER PUBLICATIONS

"Written Opinion of the International Searching Authority (Form PCT/ISA/237) of PCT/JP2020/038469," mailed on Dec. 22, 2020, with English translation thereof, pp. 1-5.

"Office Action of Japan Counterpart Application", issued on May 23, 2023, with English translation thereof, pp. 1-12.

* cited by examiner

Da

RE-MEASUREMENT?

YES

NO

DEFECT INSPECTION DEVICE AND DEFECT INSPECTION METHOD

CROSS-REFERENCE TO RELATED APPLICATION

This application is a 371 application of the International PCT application serial no. PCT/JP2020/038469, filed on Oct. 12, 2020, which claims the priority benefits of Japan Patent Application No. 2020-005696, filed on Jan. 17, 2020. The entirety of each of the above-mentioned patent applications is hereby incorporated by reference herein and made a part of this specification.

TECHNICAL FIELD

The present invention relates to a defect inspection device and a defect inspection method.

BACKGROUND ART

In the related art, a defect inspection device using a laser interference method has been known. Such a defect inspection device is disclosed in, for example, JP2017-219318A.

The defect inspection device described in JP2017-219318A includes an excitation unit that excites an elastic wave in an object to be inspected, an illumination unit that irradiates a measurement region on a surface of the object to be inspected with strobe illumination, and a displacement measurement unit. The displacement measurement unit is configured to collectively measure displacements of points in the measurement region in a front-rear direction in at least three different phases of an elastic wave by controlling a phase of the elastic wave and a timing of the strobe illumination. The defect inspection device described in JP2017-219318A measures a vibration state (amplitude and phase) of each point in the measurement region by measuring the displacements of the points in the measurement region in the front-rear direction by using a speckle shearing interference method, which is a form of the laser interference method. A configuration in which a discontinuous portion of the vibration state is detected as a defect by creating an image illustrating a difference in the displacement due to vibration by a difference in brightness of an image based on the vibration state (amplitude and phase) of each point in the measured measurement region and visually confirming the created image by an inspector is disclosed. Here, the speckle shearing interference method is a method of detecting a relative displacement between two points different from each other in the measurement region by applying laser lights, causing the laser lights reflected at the two points to interfere with each other, and measuring the intensity of the interference light.

CITATION LIST

Patent Literature

[PTL 1] JP2017-219318A

SUMMARY OF INVENTION

Technical Problem

Here, in a case where the defect is inspected by measuring the displacement of the measurement region of the inspection target (object to be inspected) as in the defect inspection device described in JP2017-219318A, the magnitude of the displacement that occurs in the inspection target changes depending on a value of a frequency of the excited elastic wave. Thus, although not specified in JP2017-219318A, it is necessary to excite the elastic wave at a frequency (a frequency suitable for measurement) at which a large displacement occurs in the inspection target in order to effectively inspect the defect. However, the laser interference method is used to search for a frequency suitable for measurement by measuring the inspection target and determining whether or not the frequency to excite the inspection target is appropriate based on the measurement result. The time and effort required to repeat the determination and the determination are a burden on the inspection worker. Thus, there is a demand for a defect inspection device and a defect inspection method that can reduce a burden on an inspection worker for searching for a frequency suitable for measurement by the laser interference method.

The present invention has been made to solve the above-mentioned problems, and one object of the present invention is to provide a defect inspection device and a defect inspection method capable of reducing a burden on an inspection worker for searching for a frequency suitable for measurement by a laser interference method.

Solution to Problem

In order to achieve the above object, a defect inspection device according to a first aspect of the present invention includes an excitation unit that excites an elastic wave in an inspection target, an irradiation unit that irradiates a measurement region of the inspection target with laser lights, a measurement unit that causes the laser lights reflected in the measurement region to interfere with each other by a laser interference method, and measures the interfered laser lights, and a control unit that acquires vibration state information which is information about a state of the elastic wave excited in the inspection target for a plurality of frequencies by changing a frequency of excitation vibration caused by the excitation unit in order to excite the elastic wave in the inspection target, and extracts recommended frequencies recommended for inspecting a defect of the inspection target from among the plurality of frequencies based on the acquired vibration state information for the plurality of frequencies. The vibration state information includes the information about the state of the excitation vibration as a start of the elastic wave excited in the inspection target.

A defect inspection method according to a second aspect of the present invention includes a step of exciting an elastic wave in an inspection target, a step of irradiating a measurement region of the inspection target with laser lights, a step of causing the laser lights reflected in the measurement region to interfere with each other by a laser interference method and measuring the interfered laser lights, and a step of acquiring vibration state information which is information about a state of the elastic wave excited in the inspection target for a plurality of frequencies by changing a frequency of excitation vibration caused in order to excite the elastic wave in the inspection target, and extracting recommended frequencies recommended for inspecting a defect of the inspection target from among the plurality of frequencies based on the acquired vibration state information for the plurality of frequencies.

Advantageous Effects of Invention

In the defect inspection device in the first aspect and the defect inspection method in the second aspect, the vibration state information which is the information about the state of the elastic wave excited by the inspection target is acquired for the plurality of frequencies by changing the frequency of the excitation vibration generated in order to excite the elastic wave in the inspection target. As a result, the state of the elastic wave can be acquired based on the vibration state information at each of the plurality of frequencies. Thus, it is possible to determine whether or not each of the plurality of frequencies is suitable for measurement for inspecting the defect of the inspection target by referring to the state of the elastic wave. In the present invention, the recommended frequencies recommended for inspecting the defect of the inspection target are extracted from among the plurality of frequencies based on the acquired vibration state information for the plurality of frequencies. As a result, the frequency determined to be the frequency suitable for the measurement based on the vibration state information can be extracted as the recommended frequency recommended for the defect inspection. Thus, the recommended frequencies recommended for the inspection of the defect of the inspection target can be acquired by acquiring the vibration state information without measuring the displacement of the elastic wave excited in the inspection target by measuring the laser light interfered by the laser interference method. As a result, since the frequencies suitable for the measurement (recommended frequencies) can be acquired without repeating the measurement of the inspection target by the laser interference method and the determination of the measurement result, it is possible to reduce the burden on the inspection worker for searching for the frequency suitable for the measurement by the laser interference method.

DESCRIPTION OF EMBODIMENTS

Hereinafter, embodiments embodying the present invention will be described with reference to the drawings.

First Embodiment (Overall Configuration of Defect Inspection Device)

A defect inspection device 100 according to a first embodiment of the present invention will be described with reference to FIGS. 1 to 7.

Figure 1:
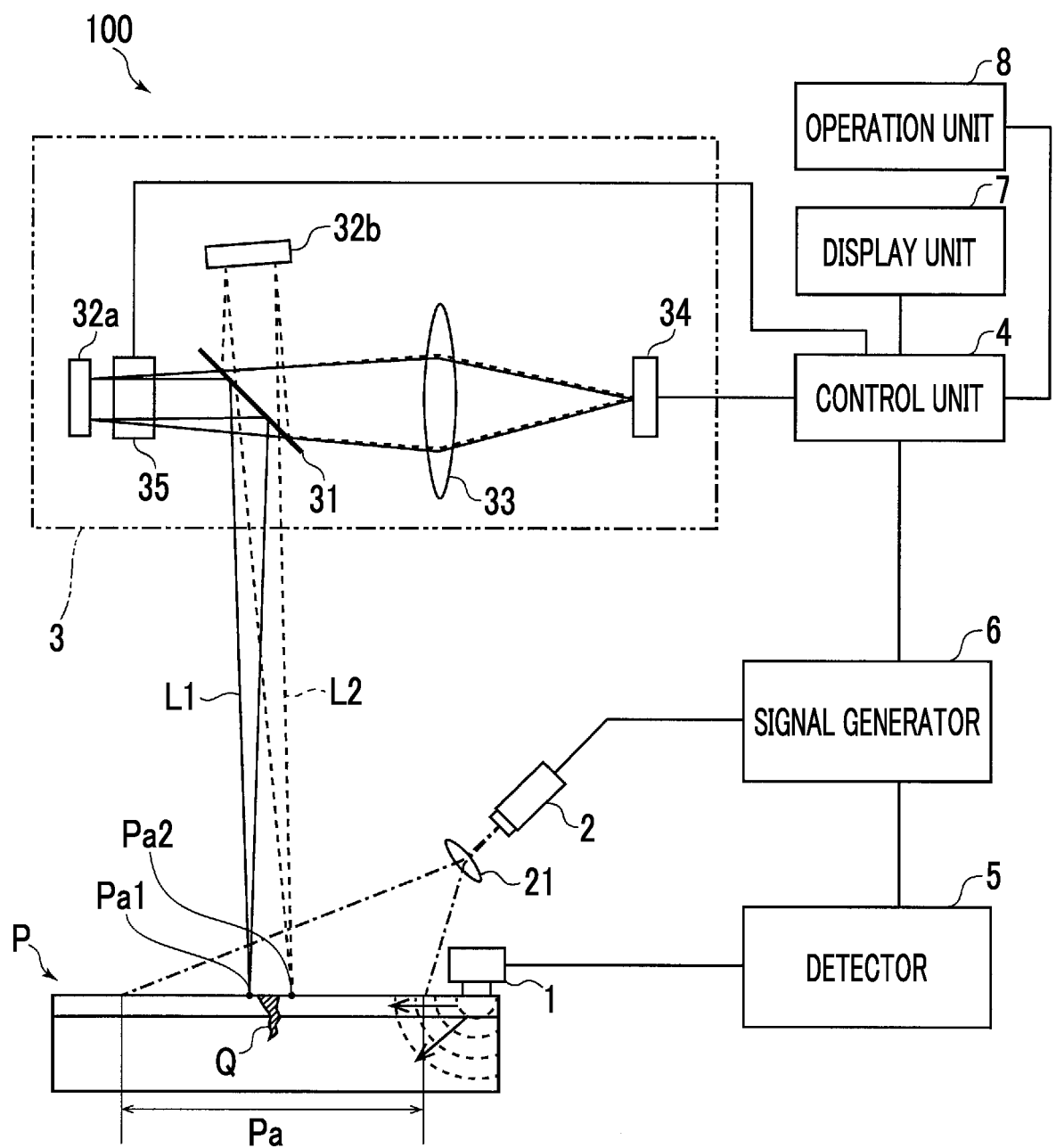
FIG. 1 is a diagram for describing a configuration of a defect inspection device according to a first embodiment.

As shown in FIG. 1, the defect inspection device 100 according to the present embodiment includes a vibrator 1, an irradiation unit 2, a speckle shearing interferometer 3, a control unit 4, a detector 5, a signal generator 6, a display unit 7, and an operation unit 8. The vibrator 1 is an example of an "excitation unit" in the claims, and the speckle shearing interferometer 3 is an example of a "measurement unit" in the claims.

The vibrator 1 and the irradiation unit 2 are connected to the signal generator 6 via a cable.

The vibrator 1 excites an elastic wave in a measurement region Pa of an inspection target P. Specifically, the vibrator 1 is disposed so as to be in contact with the inspection target P, converts an AC signal from the signal generator 6 into mechanical vibration, and generates excitation vibration to excite the elastic wave in the measurement region Pa. A frequency of the elastic wave excited by the vibrator 1 to the inspection target P is equal to a frequency of the vibration (excited vibration) of the vibrator 1. That is, a frequency of the AC signal input to the vibrator 1 and the frequency of the elastic wave excited by the vibrator 1 to the inspection target P are equal frequencies.

The irradiation unit 2 irradiates the measurement region Pa of the inspection target P with laser lights. The irradiation unit 2 includes a laser light source (not shown). The laser lights emitted from the laser light source are applied while spreading over the entire measurement region Pa on a surface of the inspection target P by an illumination light lens 21. The irradiation unit 2 applies the laser lights at a predetermined timing based on an electric signal from the signal generator 6. That is, the irradiation unit 2 irradiates the inspection target P with the laser lights corresponding to the elastic wave generated by the vibrator 1. The laser light source is, for example, a laser diode and applies laser lights (near infrared light) having a wavelength of 785 nm.

The speckle shearing interferometer 3 causes laser lights reflected in the measurement region Pa to interfere with each other by a laser interference method, and measures the interfered laser lights. The speckle shearing interferometer 3 causes laser lights reflected at two different points in the measurement region Pa excited by the vibrator 1 to interfere with each other by the laser interference method. The speckle shearing interferometer 3 includes a beam splitter 31, a first reflecting mirror 32a, a second reflecting mirror 32b, a condenser lens 33, an image sensor 34, and a phase shifter 35.

The beam splitter 31 includes a half mirror. The beam splitter 31 is disposed at a position where the laser light reflected in the measurement region Pa of the inspection target P is incident. The beam splitter 31 reflects the incident laser light toward the first reflecting mirror 32a like an optical path shown by a straight line L1 in FIG. 1, and transmits the laser light to the second reflecting mirror 32b like an optical path shown by a broken line L2 in FIG. 1. The beam splitter 31 transmits the incident laser light reflected by the first reflecting mirror 32a to the image sensor 34 like the optical path shown by the straight line L1 in FIG. 1, and reflects the laser light reflected by the second reflecting mirror 32b toward the image sensor 34 as shown by the broken line L2 in FIG. 1.

The first reflecting mirror 32a is disposed so as to have an angle of 45 degrees with respect to a reflecting surface of the beam splitter 31 on an optical path of the laser light reflected by the beam splitter 31. The first reflecting mirror 32a reflects the laser light reflected by the beam splitter 31 toward the beam splitter 31.

The second reflecting mirror 32b is disposed so as to be slightly inclined from an angle of 45 degrees with respect to the reflecting surface of the beam splitter 31 on an optical path of the laser light passing through the beam splitter 31. The second reflecting mirror 32b reflects the laser light transmitted through the beam splitter 31 and incident toward the beam splitter 31.

The condenser lens 33 is disposed between the beam splitter 31 and the image sensor 34, and causes the laser light transmitted through the beam splitter 31 (straight line L1 in FIG. 1) and the laser light reflected by the beam splitter 31 (broken line L2 in FIG. 1) to be focused.

The image sensor 34 captures the interfered laser lights. The image sensor 34 has a large number of detection elements, and is disposed on the optical path of the laser light (straight line L1 in FIG. 1) reflected by the beam splitter 31, then reflected by the first reflecting mirror 32a, and transmitted through the beam splitter 31 and the laser light (broken line L2 in FIG. 1) transmitted through the beam splitter 31, then reflected by the second reflecting mirror 32b, and reflected by the beam splitter 31. The image sensor 34 includes, for example, a CMOS image sensor, a CCD image sensor, or the like.

The phase shifter 35 is disposed between the beam splitter 31 and the first reflecting mirror 32a, and changes (shifts) a phase of the transmitted laser light (straight line L1 in FIG. 1) under the control of the control unit 4. Specifically, the phase shifter 35 is configured to change an optical path length of the transmitted laser light.

In the speckle shearing interferometer 3, for example, the laser light reflected by a position Pa1 on the surface of the measurement region Pa and the first reflecting mirror 32a (straight line L1 in FIG. 1) and the laser light reflected by a position Pa2 on the surface of the measurement region Pa and the second reflecting mirror 32b (broken line L2 in FIG. 1) interfere with each other and are incident on the same location of the image sensor 34 (detected by the same element). The positions Pa1 and Pa2 are positions separated from each other by a small distance. The laser lights reflected from different positions in each region of the measurement region Pa are guided by the speckle shearing interferometer 3 and are incident on the image sensor 34.

The control unit 4 controls each unit of the defect inspection device 100. The control unit 4 generates a defect inspection image D (see FIG. 6) based on the interfered laser lights measured by the speckle shearing interferometer 3. The control unit 4 is, for example, a computer including a central processing unit (CPU). The details of the control of the control unit 4 will be described later.

The detector 5 detects a current input to the vibrator 1. The detector 5 transmits a detection signal indicating the detected current to the signal generator 6.

The signal generator 6 outputs an AC signal for controlling the vibration of the vibrator 1 and a timing of irradiation of the laser light of the irradiation unit 2 based on the control by the control unit 4. The signal generator 6 includes, for example, a field-programmable gate array (FPGA).

Figure 2:
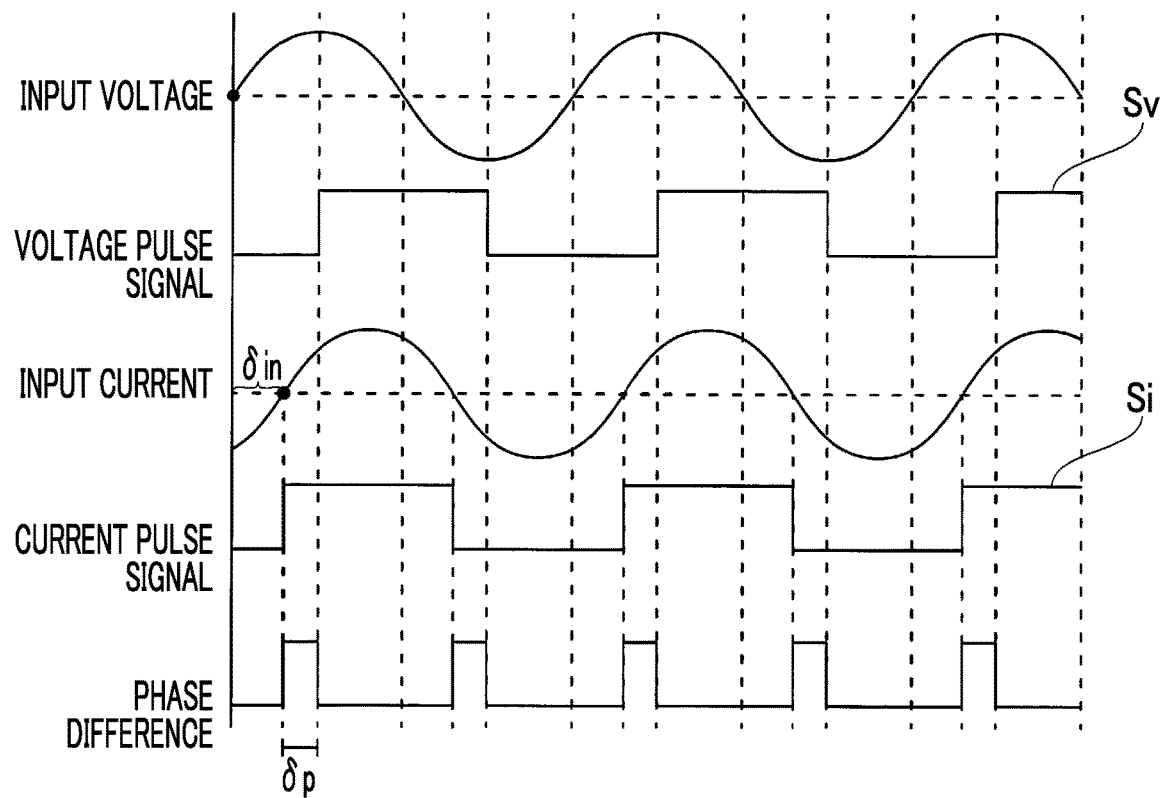
FIG. 2 is a diagram for describing acquisition of a phase difference between a voltage and a current input to a vibrator by a signal generator according to the first embodiment.

The signal generator 6 acquires a voltage input to the vibrator 1 based on the output AC signal. The signal generator 6 acquires the current input to the vibrator 1 based on the detection signal output by the detector 5. The signal generator 6 acquires a phase difference $\delta_{in}$ between the voltage input to the vibrator 1 and the current input to the vibrator 1. Specifically, as shown in FIG. 2, the signal generator 6 converts the acquired voltage input to the vibrator 1 into a pulse signal and delays the phase by $\pi/2$ to generate a voltage pulse signal Sv. Then, the signal generator 6 generates a current pulse signal Si by converting the current input to the vibrator 1 into a pulse signal. The signal generator 6 acquires a phase difference $\delta_p$ by measuring a difference between the generated voltage pulse signal Sv and the generated current pulse signal Si. The signal generator 6 transmits the acquired phase difference $\delta_p$ to the control unit 4. Since the voltage pulse signal Sv delays the phase by $\pi/2$ from the input voltage, the smaller the phase difference $\delta_{in}$, the larger the phase difference $\delta_p$.

The display unit 7 displays an image generated by the control unit 4. The display unit 7 displays the defect inspection image D which is a generated image illustrating a vibration state of the elastic wave excited in the measurement region Pa of the inspection target P. The display unit 7 includes a liquid crystal display, an organic electro-luminescence (EL) display, and the like.

The operation unit 8 receives an input operation by an inspection worker. The operation unit 8 is a pointing device such as a keyboard and a mouse.

The inspection target P is, for example, a coated steel sheet in which a coating film is coated on the steel sheet. A defective portion Q is a defective portion occurring inside (surface layer or surface) of the measurement region Pa, and includes cracks, peeling, and the like.

(About Extraction Control of Recommended Frequency by Control Unit)

Figure 3:
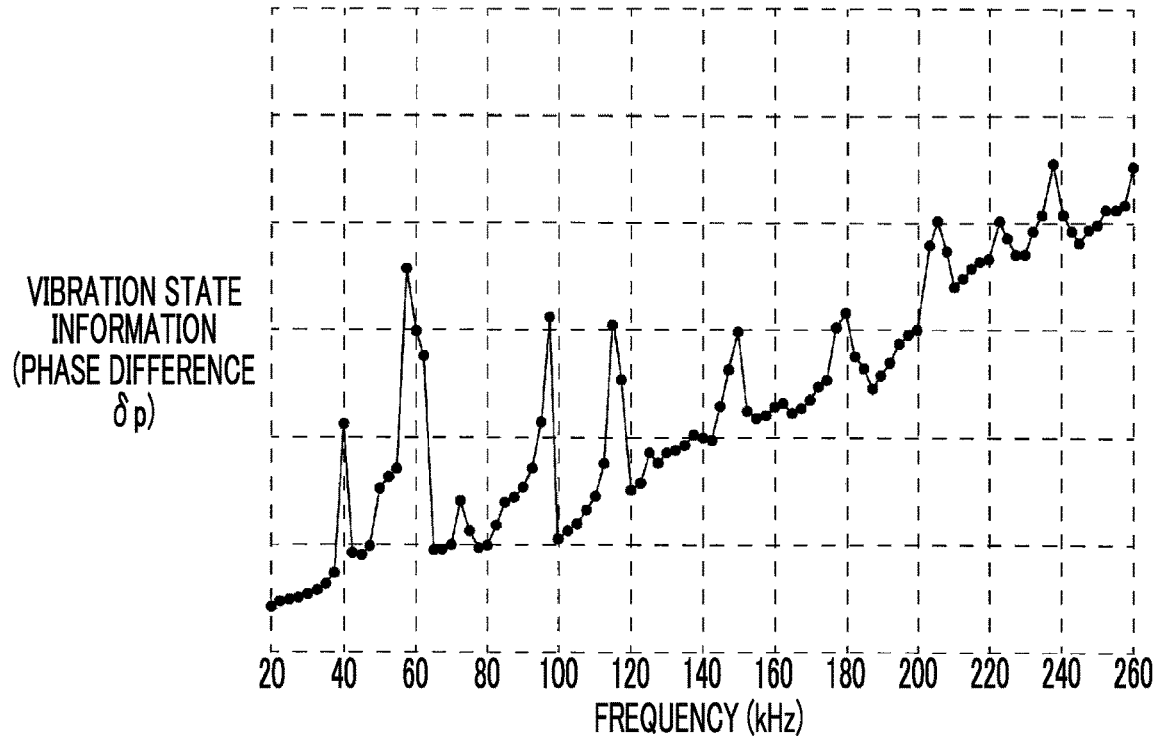
FIG. 3 is a diagram illustrating a graph representing a relationship between a frequency of an elastic wave and vibration state information according to the first embodiment.

As shown in FIG. 3, the control unit 4 acquires vibration state information which is information about a state of the elastic wave excited by the inspection target P for a plurality of frequencies by changing the frequency of the excitation vibration caused by the vibrator 1 in order to excite the elastic wave in the inspection target P. Here, the vibration state information is information indicating the state of the vibration of the elastic wave excited by the inspection target P. That is, the vibration state information is information corresponding to the magnitude of displacement caused in the inspection target P due to the vibration of the excited elastic wave. The magnitude of the displacement caused in the inspection target P changes depending on a value of the frequency of the excited elastic wave. Thus, in order to extract recommended frequencies F (see FIG. 4) which are frequencies recommended for defect inspection, the control unit 4 acquires the information corresponding to the magnitude of the displacement caused in the inspection target P at each of the plurality of frequencies.

Here, when the frequency of the vibration (frequency of the input AC signal) of the vibrator 1 operated by the AC signal changes, the efficiency of converting the AC signal into the mechanical vibration by the vibrator 1 changes. That is, the vibrator 1 vibrates efficiently at a resonance frequency of a measurement system including the vibrator 1 and the inspection target P. That is, the vibrator 1 is vibrated at the resonance frequency (the elastic wave having the resonance frequency is excited in the inspection target P), and thus, an electric energy input to the vibrator 1 is efficiently converted into a vibration energy. Thus, in a case where the vibrator 1 is vibrated with the same power, the vibration of the vibrator 1 becomes large at the resonance frequency. That is, the vibrator 1 is vibrated at the resonance frequency (the elastic wave of the resonance frequency is excited in the inspection target P), and thus, the displacement caused in the inspection target P becomes large. Accordingly, the control unit 4 acquires the frequency at which the displacement caused in the inspection target P due to the excited elastic wave changes significantly (frequency suitable for measurement) by acquiring the resonance frequency of the measurement system including the vibrator 1 and the inspection target P.

In a case where the vibrator 1 is vibrated at the resonance frequency of the measurement system including the vibrator 1 and the inspection target P, the phase difference $\delta_{in}$ between the voltage input to the vibrator 1 and the current input to the vibrator 1 becomes a minimal value. That is, at a frequency where the phase difference $\delta_{in}$ is small, the displacement caused in the inspection target P is large, and at a frequency where the phase difference $\delta_{in}$ is large, the displacement caused in the inspection target P is small. Since the signal generator 6 converts the acquired voltage input to the vibrator 1 into the pulse signal and generates the voltage pulse signal Sv by delaying the phase by $\pi/2$, in a case where the vibrator 1 is vibrated at the resonance frequency, the phase difference $\delta_p$ between the voltage pulse signal Sv and the current pulse signal Si becomes a maximal value. That is, at a frequency where the phase difference $\delta_p$ is large, the displacement caused in the inspection target P is large, and at a frequency where the phase difference $\delta_p$ is small, the displacement caused in the inspection target P is small. In the first embodiment, the control unit 4 is configured to acquire the vibration state information based on the phase difference $\delta_{in}$ between the voltage input to the vibrator 1 and the current input to the vibrator 1 for the plurality of frequencies (for example, 200 frequencies). Specifically, the control unit 4 acquires the vibration state information based on the phase difference $\delta_p$ between the voltage pulse signal Sv in which the voltage input to the vibrator 1 is converted into the pulse signal and the current pulse signal Si in which the current input to the vibrator 1 is converted into the pulse signal. That is, the control unit 4 acquires, as the vibration state information, the phase difference $\delta_p$ between the voltage pulse signal Sv and the current pulse signal Si measured by the signal generator 6 for the plurality of frequencies. In a graph of FIG. 3, a vertical axis represents the phase difference $\delta_p$ (the larger the value, the smaller the value of the phase difference $\delta_{in}$), and a horizontal axis represents the frequency of the elastic wave (frequency of the excitation vibration by the vibrator 1) excited in the inspection target P when the phase difference $\delta_p$ is acquired.

Figure 4:
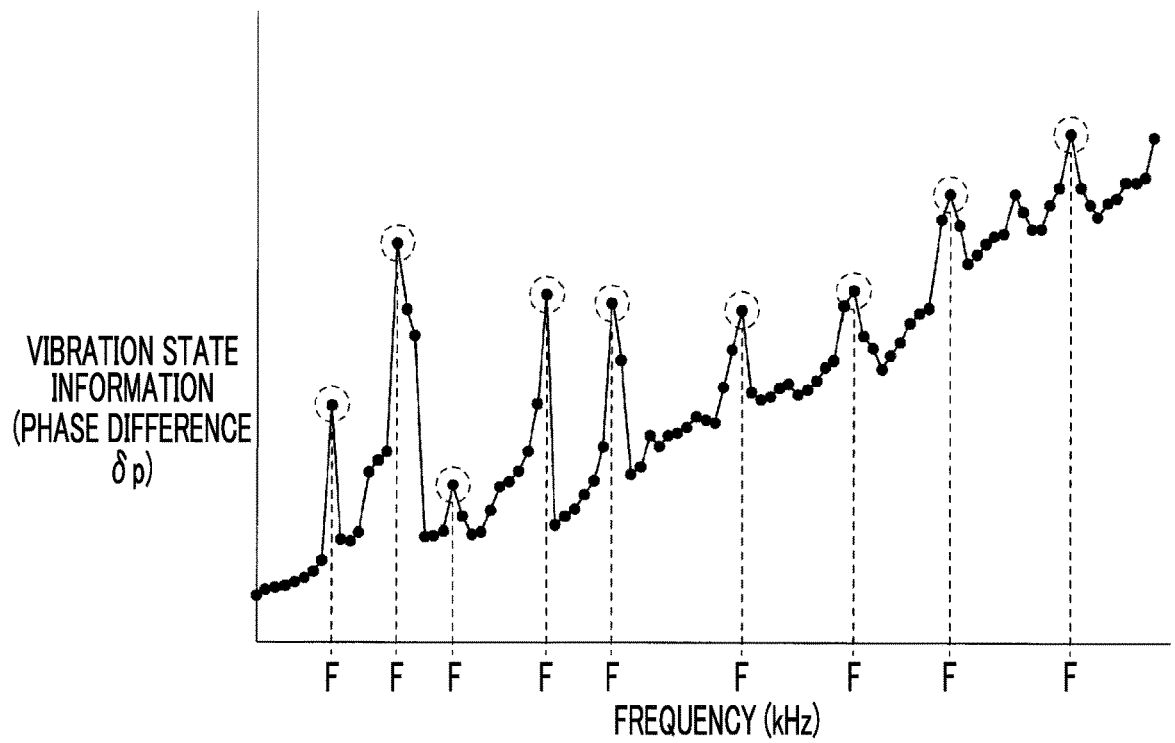
FIG. 4 is a diagram for describing extraction of a recommended frequency according to the first embodiment.

As shown in FIG. 4, the control unit 4 extracts the recommended frequencies F recommended for inspecting the defect of the inspection target P from among the plurality of frequencies based on the acquired vibration state information (phase difference $\delta_p$) for the plurality of frequencies. Specifically, the control unit 4 extracts, as the recommended frequencies F, a frequency at which the phase difference $\delta_p$ between the voltage pulse signal Sv and the current pulse signal Si is maximized (frequency at which the phase difference $\delta_{in}$ between the voltage and the current input to the vibrator 1 becomes a minimal value) from among the plurality of frequencies by sequentially changing (sweeping or scanning) the frequency of the elastic wave excited in the inspection target P in a predetermined band. That is, the control unit 4 extracts, as the recommended frequencies F (resonance frequency) recommended for measurement, the frequency at which the phase difference $\delta_p$ becomes the maximal value from among the acquired plurality of frequencies. The predetermined band is, for example, a band (range) of a frequency of 20 kHz (kilohertz) or more and 400 kHz or less, which is a frequency at which the defect inspection device 100 can acquire the vibration state information. The "maximal" mentioned herein means the phase difference $\delta_p$ that is a value in which the maximal phase difference $\delta_p$ is the largest at a frequency near the frequency at which the phase difference $\delta_p$ becomes maximal, as compared with all the acquired phase differences $\delta_p$. The "near the frequency at which the phase difference $\delta_p$ becomes maximal" includes both the frequency itself at which the phase difference $\delta_p$ becomes maximal and the frequency having a value near the frequency at which the phase difference $\delta_p$ becomes maximal. In some method for generating the voltage pulse signal Sv and the current pulse signal Si, the frequency at which the phase difference $\delta_p$ becomes a minimal value may be the recommended frequency F.

The control unit 4 acquires a type of a defect to be detected in advance. Here, a frequency for detection differs depending on a type of a defect to be measured. That is, in order to detect a relatively small defect, a high frequency corresponding to the type of the defect is required. For example, in order to detect peeling of a coating film, a half wavelength of the elastic wave needs to be larger than a size of the defect. Since a wavelength of the elastic wave excited in the inspection target P changes based on the frequency of the elastic wave and a speed of sound of the inspection target P, it is necessary to set the band with the recommended frequency F suitable for measurement based on the type of the inspection target P to be measured and the type of the defect to be detected. Thus, the control unit 4 determines the band (range) of the frequency to be extracted as the recommended frequency F depending on the type of the defect to be detected. That is, based on a preset type of defect (frequency band suitable for measurement), the recommended frequencies F are extracted in a state where vibration state information corresponding to a band unsuitable for measurement due to a low frequency is excluded from the acquired vibration state information. The recommended frequencies F may be extracted from among all the frequencies for which the phase difference $\delta_p$ is acquired without acquiring the type of the defect in advance. The band of the frequency for extracting the recommended frequencies F may be set based on an input operation by the inspection worker.

Figure 5:
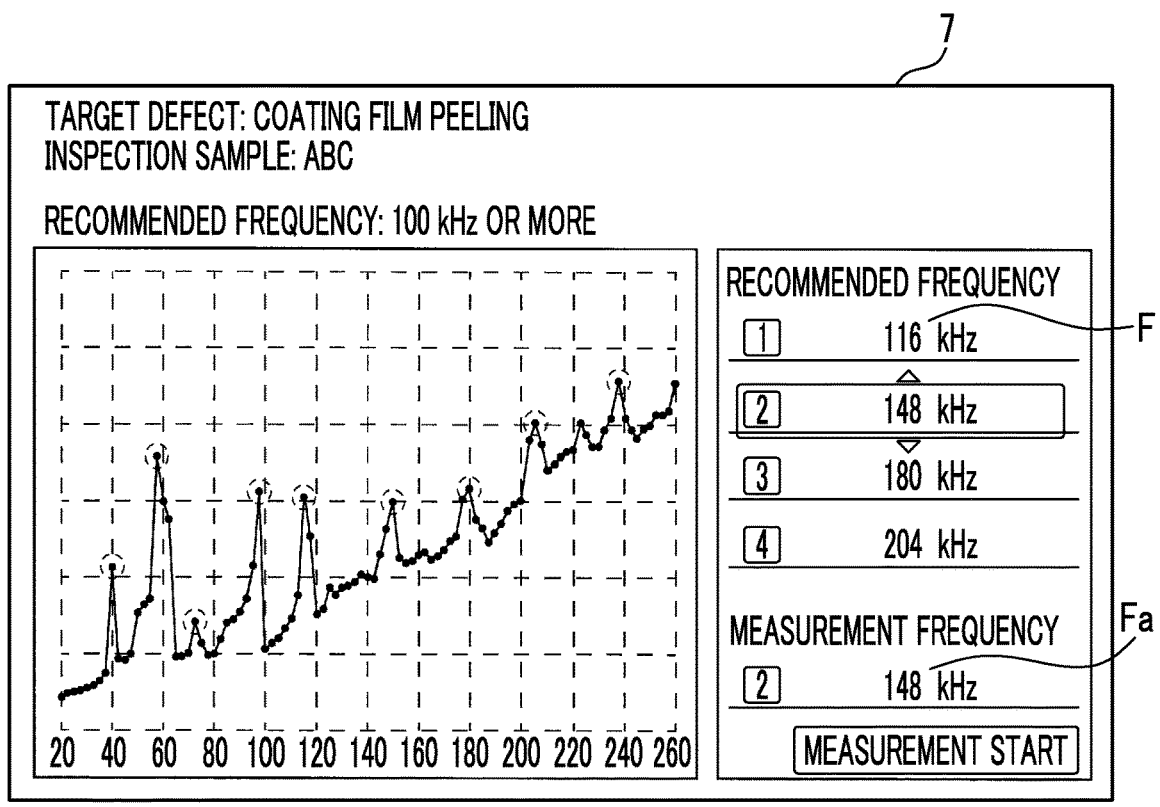
FIG. 5 is a diagram for describing display of a display unit for setting a measurement frequency according to the first embodiment.

In the first embodiment, the control unit 4 controls the display of the display unit 7. As shown in FIG. 5, the control unit 4 is configured to display the extracted recommended frequencies F in an identifiable manner. The control unit 4 is configured to display a measurement frequency Fa to be used for the measurement in a selectable manner from among the extracted recommended frequencies F.

Specifically, the control unit 4 acquires the phase difference $\delta_p$ for the plurality of frequencies by sequentially changing the frequency of the excitation vibration (frequency of the elastic wave excited in the inspection target P) caused by the vibrator 1 in a predetermined band in order to excite the elastic wave in the inspection target P, and displays a graph representing a relationship between each of the plurality of frequencies and the phase difference $\delta_p$ in the display unit 7. The control unit 4 displays the extracted recommended frequencies F side by side on the display unit 7. The control unit 4 displays the type of the defect to be measured which is acquired in advance on the display unit 7.

The control unit 4 controls an operation of each unit of the defect inspection device 100 based on the input operation for the operation unit 8. The control unit 4 sets the measurement frequency Fa to be used for the measurement from among the extracted recommended frequencies F based on the input operation (selection operation) for the operation unit 8.

(About Generation of Defect Inspection Image at Measurement Frequency by Control Unit)

The control unit 4 measures the displacement of the measurement region Pa by irradiating the measurement region Pa of the inspection target P in which the elastic wave of the set (selected) measurement frequency Fa is excited with the laser light. The control unit 4 measures the displacement of the measurement region Pa based on an intensity pattern of the interfered laser lights captured by the image sensor 34 while changing the phase of the laser light by the phase shifter 35.

The control unit 4 activates the phase shifter 35 disposed in the speckle shearing interferometer 3 by an actuator (not shown) to change the phase of the transmitted laser light. As a result, for example, a phase difference between a laser light reflected at a point Pa1 and a laser light reflected at a point Pa2 changes. The detection element of the image sensor 34 detects the intensity of the interference light in which these two laser lights interfere with each other.

The control unit 4 controls the vibration of the vibrator 1 and the timing of irradiation of the laser light irradiated by the irradiation unit 2 via the signal generator 6, and captures an image while changing a phase shift amount. The control unit 4 changes a phase shift amount by $\lambda/4$, and captures a total of 37 images of 32 images at timings j (j=0 to 7) at which the phase of the elastic wave is different by T/8 at phase shift amounts (0, $\lambda/4$, $\lambda/2$, and $3\lambda/4$) and five images during turning off before and after the phase shift amounts (0, $\lambda/4$, $\lambda/2$, and $3\lambda/4$). $\lambda$ is a wavelength of the laser light. T is a period of the elastic wave excited in the measurement region Pa.

Figure 6:
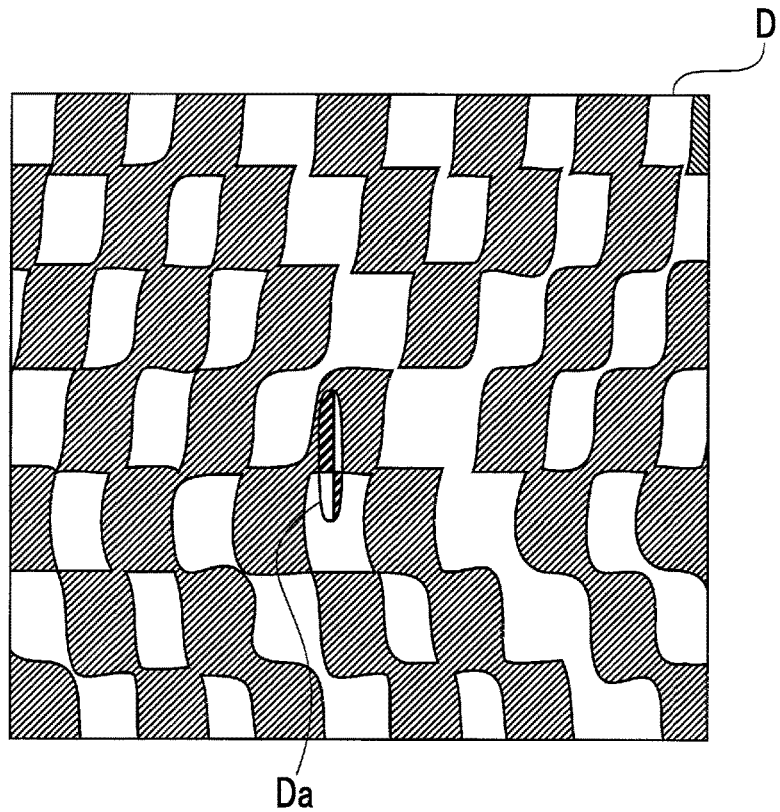
FIG. 6 is a diagram for describing display of a defect inspection image according to the first embodiment.

The control unit 4 processes the detection signal detected in each of the detection elements of the image sensor 34 by the following procedure, and generates the defect inspection image D which is an image illustrating the state of the vibration (spatial distribution image of the vibration state) (see FIG. 6).

The control unit 4 obtains an optical phase (phase difference between the two optical paths when the phase shift amount is zero) $\Phi_j$ by Equation (1) from luminance values $I_0$ to $I_3$ of four images in which the timings j (j=0 to 7) of the phase of the elastic wave are the same but the phase shift amounts of the laser light are different by $\lambda/4$.

$$\Phi_j = -\arctan\{(I_3-I_1)/(I_2-I_0)\} \quad (1)$$

The control unit 4 obtains approximation coefficients A, $\varphi$, and C in Equation (2) by performing a sine wave approximation to the optical phase $\Phi_j$ by a least squares method.

$$\Phi_j = A\cos(\varphi + j\pi/4) + C = B\exp(j\pi/4) + C \quad (2)$$

However, B is a complex amplitude and is expressed as in the equation (3).

$$B = A\exp(i\varphi) : \text{Complex amplitude} \quad (3)$$

The control unit 4 generates the defect inspection image D as a moving image (30 to 60 frames) illustrating an optical phase change at each phase time $\xi$ ($0 \leq \xi \leq 2\pi$) of the vibration of the elastic wave from an approximate expression obtained by removing a constant term C from Equation (2). In the above procedure, a spatial filter is appropriately applied to the complex amplitude B for noise removal. The phase shift amount and a step of the timing of irradiation of the laser light are not limited thereto. In this case, a calculation expression is different from the above Equations (1) to (3).

As shown in FIG. 6, the control unit 4 displays the defect inspection image D on the display unit 7 such that a discontinuous region Da in the vibration state can be visually recognized as the defective portion Q occurring inside the inspection target P. Here, in a case where a shape of the inspection target P itself includes unevenness or the like, discontinuity in the vibration state may occur even at a boundary between a flat surface portion and an uneven portion. Thus, the control unit 4 may be configured to detect the defective portion Q occurring inside based on shape information of the inspection target P so as not to detect the unevenness as the defect.

Figure 7:
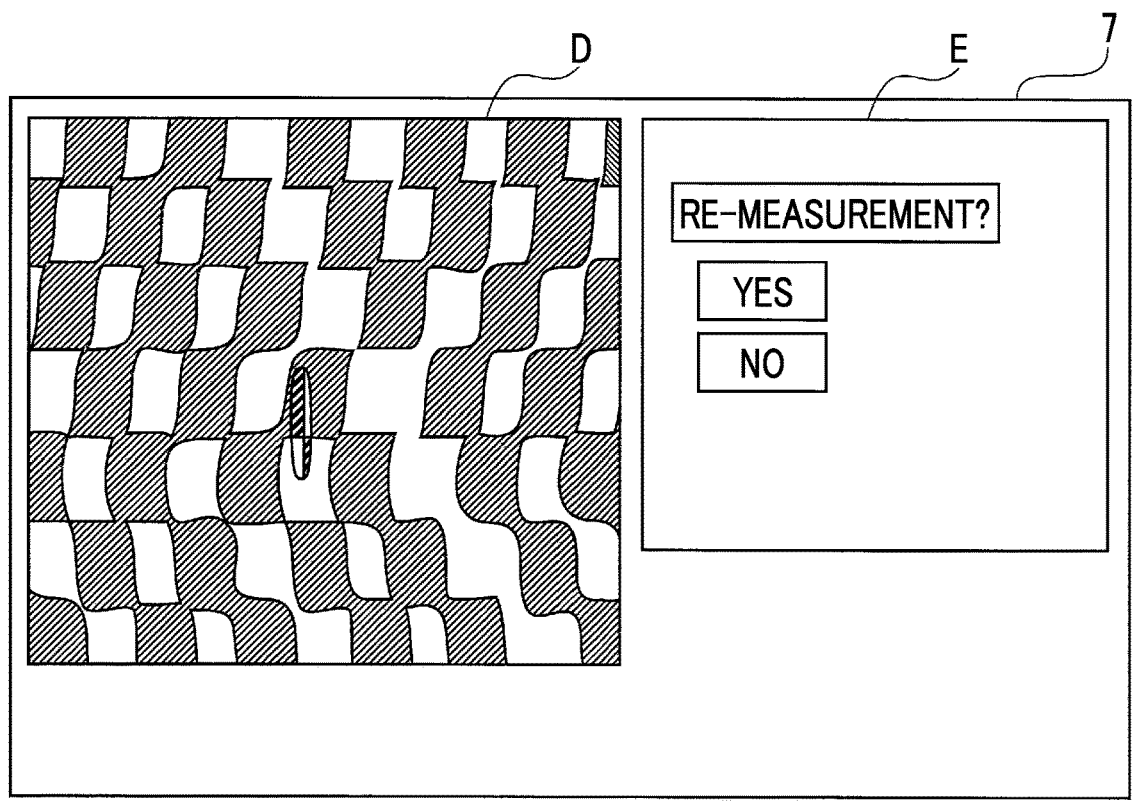
FIG. 7 is a diagram for describing display of the display unit for performing the measurement again according to the first embodiment.

The control unit 4 excites an elastic wave having a frequency different from the measured measurement frequency Fa in the inspection target P based on an input operation by the inspection worker, and performs the measurement again. That is, as shown in FIG. 7, the control unit 4 displays, in a region E of the display unit 7, a display for receiving an input operation for performing the measurement again by the inspection worker after acquiring the result of the measurement (defect inspection) by the measurement frequency Fa. The control unit 4 displays the extracted recommended frequencies F on the display unit 7 again based on an input operation by the inspection worker for the region E of the display unit 7. The control unit 4 sets the measurement frequency Fa for performing the measurement again based on a selection operation by the inspection worker. The control unit 4 performs the measurement again by exciting the elastic wave of the measurement frequency Fa set again in the inspection target P.

(About Defect Inspection Method)

Figure 8:
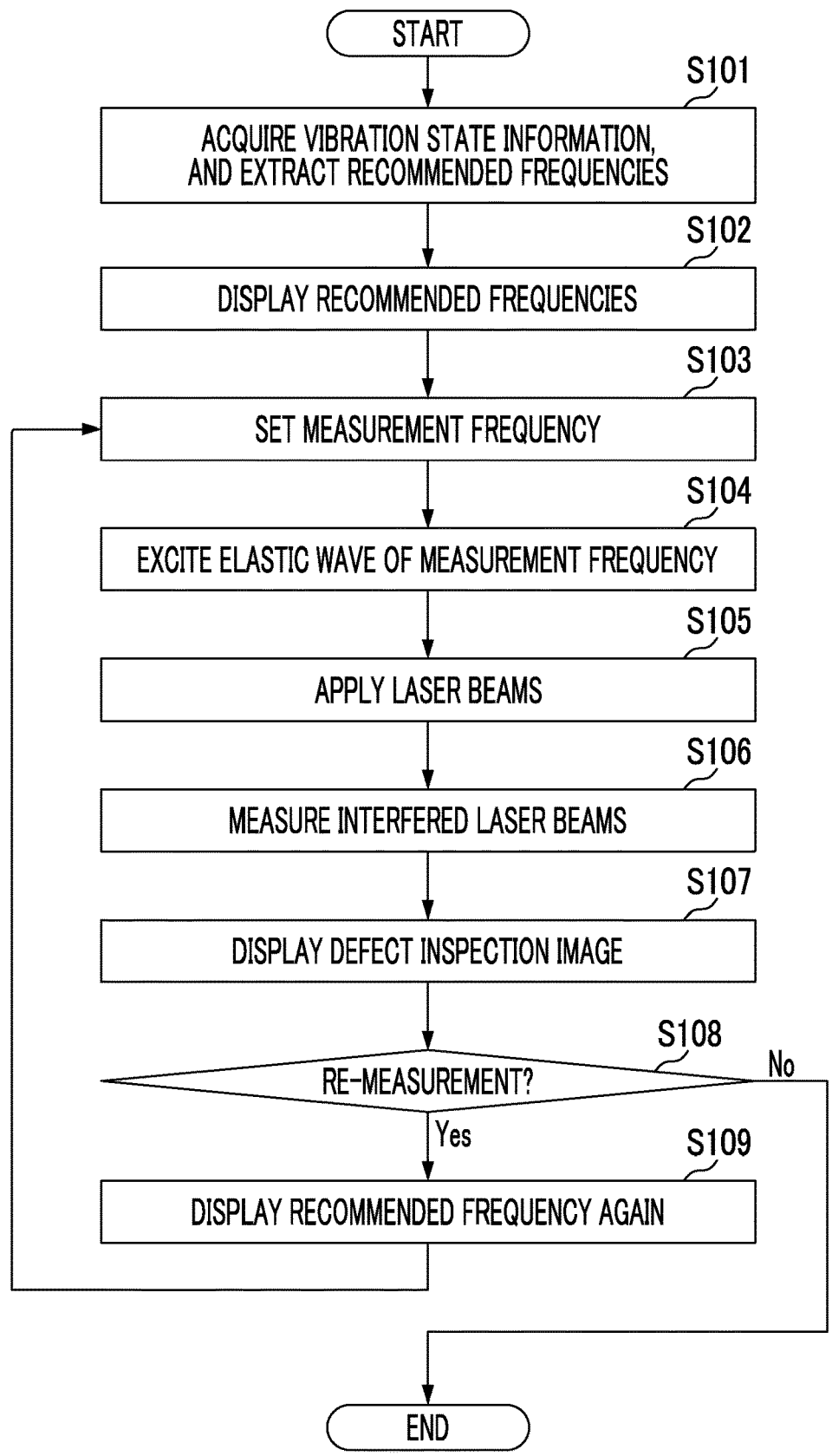
FIG. 8 is a diagram (flow chart) for describing a defect inspection method according to the first embodiment.

Next, a defect inspection method using the defect inspection device 100 according to the first embodiment will be described with reference to FIG. 8.

First, in step 101, the frequency of the excitation vibration caused by the vibrator 1 is sequentially changed in a predetermined band in order to excite the elastic wave in the inspection target P, the vibration state information which is the information about the state of the elastic waves excited in the inspection target P is acquired for the plurality of frequencies. Based on the acquired vibration state information for the plurality of frequencies, the recommended frequencies F recommended for the inspection of the defect of the inspection target P are extracted from among the plurality of frequencies.

Subsequently, in step 102, the extracted recommended frequencies F are displayed in an identifiable manner.

Subsequently, in step 103, the measurement frequency Fa is set based on a selection operation for selecting the measurement frequency Fa to be used for the measurement from the extracted recommended frequencies F.

Subsequently, in step 104, the elastic wave having the set measurement frequency Fa is excited in the inspection target P.

Subsequently, in step 105, the measurement region Pa of the inspection target P in a state where the elastic wave of the measurement frequency Fa is excited is irradiated with the laser light.

Subsequently, in step 106, the laser lights reflected in the measurement region Pa interfere with each other by the laser interference method. The interfered laser lights are measured.

Subsequently, in step 107, the defect inspection image D which is the image (spatial distribution image of the vibration state) illustrating the vibration state of the measurement region Pa generated based on the measured and interfered laser lights is displayed.

Subsequently, in step 108, it is determined whether or not to excite an elastic wave having a frequency different from the measured measurement frequency Fa in the inspection target P to perform the measurement again. In a case where it is determined to perform the measurement again, processing proceeds to step 109. In a case where it is not determined to perform the measurement again, control processing for defect inspection is ended.

In step 109, the extracted recommended frequencies F are displayed again in an identifiable manner. Processing returns to step 103.

Effects of First Embodiment

In the first embodiment, the following effects can be obtained.

In the defect inspection device 100 of the first embodiment, as described above, the frequency of the excitation vibration caused in order to excite the elastic wave in the inspection target P is changed, and thus, the vibration state information which is the information about the state of the elastic wave excited in the inspection target P is acquired for the plurality of frequencies. As a result, the state of the elastic wave can be acquired based on the vibration state information at each of the plurality of frequencies. Thus, it is possible to determine whether or not each of the plurality of frequencies is suitable for measurement for inspecting the defect of the inspection target P by referring to the state of the elastic wave. In the first embodiment, the recommended frequencies F recommended for inspecting the defect of the inspection target P are extracted from among the plurality of frequencies based on the acquired vibration state information for the plurality of frequencies. As a result, the frequency determined to be the frequency suitable for the measurement based on the vibration state information can be extracted as the recommended frequency F recommended for the defect inspection. Thus, the recommended frequencies F recommended for the inspection of the defect of the inspection target P can be acquired by acquiring the vibration state information without measuring the displacement of the elastic wave excited in the inspection target P by measuring the interfered laser lights by the laser interference method. As a result, since the frequencies suitable for the measurement (recommended frequencies F) can be acquired without repeating the measurement of the inspection target P by the laser interference method and the determination of the measurement result, it is possible to reduce the burden on the inspection worker for searching for the frequency suitable for the measurement by the laser interference method.

In the first embodiment, further effects can be obtained by the following configurations.

That is, in the first embodiment, as described above, the control unit 4 is configured to display the extracted recommended frequencies F in an identifiable manner. With this configuration, the inspection worker can easily identify the recommended frequencies F recommended for defect inspection of the inspection target P from among the plurality of frequencies by visually recognizing the recommended frequencies.

In the first embodiment, as described above, the control unit 4 is configured to display the measurement frequency Fa to be used for the measurement in a selectable manner from among the extracted recommended frequencies F. With this configuration, the measurement frequency Fa can be easily selected from among the displayed recommended frequencies F. Thus, the measurement frequency Fa can be selected (set) more easily than in a case where the value of the measurement frequency Fa is directly input.

In the first embodiment, as described above, the control unit 4 is configured to acquire the vibration state information for the plurality of frequencies based on the phase difference $\delta_{in}$ between the voltage input to the vibrator 1 (excitation unit) and the current input to the vibrator 1. Here, in order to inspect the defect of the inspection target P by the laser interference method, the control unit 4 is configured to control the phase of the elastic wave excited in the inspection target P and the timing of the laser light applied to the measurement region Pa of the inspection target P. Thus, the control unit 4 controls the phase of the vibrator 1 in order to control the phase of the elastic wave. That is, the control unit 4 is configured to control the phase of the voltage input to the vibrator 1. Thus, as in the first embodiment, when the control unit 4 is configured to acquire the vibration state information based on the phase difference $\delta_{in}$ between the voltage input to the vibrator 1 and the current input to the vibrator 1, the vibration state information for extracting the recommended frequencies F can be acquired by the configuration for controlling the phase of the vibrator 1. Thus, it is possible to suppress the complexity of the device configuration in order to extract the recommended frequencies F.

In the first embodiment, as described above, the control unit 4 is configured to acquire the vibration state information based on the phase difference $\delta_p$ between the voltage pulse signal Sv in which the voltage input to the vibrator 1 (excitation unit) is converted into the pulse signal and the current pulse signal Si in which the current input to the vibrator 1 is converted into the pulse signal, and is configured to extract, as the recommended frequency F, the frequency at which the phase difference $\delta_p$ between the voltage pulse signal Sv and the current pulse signal Si becomes the maximal (extreme value) from among the plurality of frequencies. Here, the frequency (resonance frequency) at which the phase difference $\delta_p$ between the current pulse signal Si and the voltage pulse signal Sv becomes the maximal value, the input electric energy is efficiently converted into the energy of the vibration in the vibrator 1. Thus, as in the first embodiment, when the frequency at which the phase difference $\delta_p$ between the voltage pulse signal Sv and the current pulse signal Si becomes maximal is configured to be extracted as the recommended frequency F from among the plurality of frequencies, the frequency at which the vibration is efficiently caused (the inspection target P is efficiently displaced) can be extracted as the recommended frequency F. As a result, the frequency at which the inspection target P is efficiently displaced can be easily acquired as the recommended frequency F by measuring the current and the voltage input to the vibrator 1 without measuring the displacement of the inspection target P by the laser interference method.

(Effects of Defect Inspection Method According to First Embodiment)

The defect inspection method of the first embodiment can obtain the following effects.

In the defect inspection method of the first embodiment, the frequency of the excitation vibration caused in order to excite the elastic wave in the inspection target P is changed by the above configuration, and thus, the vibration state information which is the information about the state of the elastic wave excited in the inspection target P is acquired for the plurality of frequencies. As a result, the state of the elastic wave can be acquired based on the vibration state information at each of the plurality of frequencies. Thus, it is possible to determine whether or not each of the plurality of frequencies is suitable for measurement for inspecting the defect of the inspection target P by referring to the state of the elastic wave. In the first embodiment, the recommended frequencies F recommended for inspecting the defect of the inspection target P are extracted from among the plurality of frequencies based on the acquired vibration state information for the plurality of frequencies. As a result, the frequency determined to be the frequency suitable for the measurement based on the vibration state information can be extracted as the recommended frequency F recommended for the defect inspection. Thus, the recommended frequencies F recommended for the inspection of the defect of the inspection target P can be acquired by acquiring the vibration state information without measuring the displacement of the elastic wave excited in the inspection target P by measuring the interfered laser lights by the laser interference method. As a result, since the frequencies suitable for the measurement (recommended frequencies F) can be acquired without repeating the measurement of the inspection target P by the laser interference method and the determination of the measurement result, it is possible to reduce the burden on the inspection worker for searching for the frequency suitable for the measurement by the laser interference method.

In the first embodiment, as described above, step 102 for displaying the extracted recommended frequencies F in an identifiable manner is further provided. With this configuration, the inspection worker can easily identify the recommended frequencies F recommended for defect inspection of the inspection target P from among the plurality of frequencies by visually recognizing the recommended frequencies. Thus, the recommended frequencies F recommended for the inspection of the defect of the inspection target P can be easily acquired without measuring the displacement of the inspection target P by the laser interference method. Thus, since it is possible to suppress the re-measurement, it is possible to suppress an increase in the burden on the inspection worker due to the re-measurement.

In the first embodiment, as described above, step 109 for displaying the extracted recommended frequencies F again in an identifiable manner is further provided after step 106 for measuring the interfered laser lights. With this configuration, even after the defect is inspected by measuring the interfered laser lights, a new measurement frequency Fa can be easily selected again by visually recognizing the recommended frequencies F displayed again. Thus, even in a case where the result of the performed defect inspection (measurement result by the laser interference method) is an inappropriate result, it is possible to easily re-measure the inspection target by selecting an elastic wave having the new measurement frequency Fa again. As a result, even in a case where the defect inspection is re-measured, since the measurement frequency Fa can be easily selected, a work burden of the inspection worker can be reduced.

Second Embodiment

Next, a configuration of a defect inspection device 200 according to a second embodiment of the present invention will be described with reference to FIG. 9. Unlike the first embodiment having the configuration in which the recommended frequencies F are extracted based on the phase difference $\delta_{in}$ between the current and the voltage input to the vibrator 1, in this second embodiment, the defect inspection device is configured to extract the recommended frequencies F by measuring an impedance of the vibrator 1. The same configuration as that of the first embodiment is shown with the same reference signs in the drawings, and the description thereof will be omitted.

Figure 9:
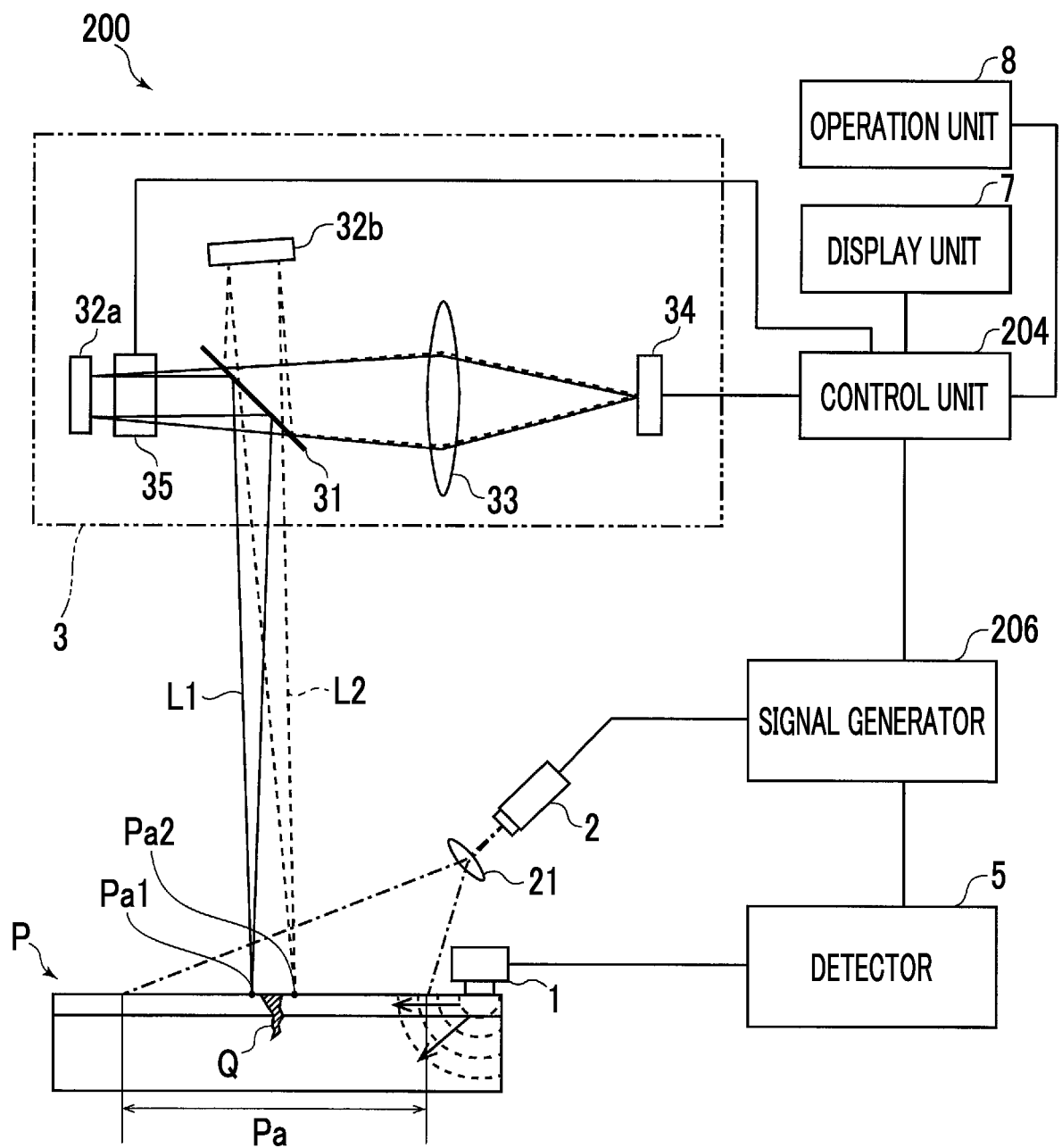
FIG. 9 is a diagram for describing a configuration of a defect inspection device according to a second embodiment.

As shown in FIG. 9, the defect inspection device 200 according to the second embodiment includes a control unit 204 and a signal generator 206.

Similar to the first embodiment, the signal generator 206 outputs an AC signal for controlling the vibration of the vibrator 1 and the irradiation timing of the laser light of the irradiation unit 2 based on the control by the control unit 204. The signal generator 206 includes, for example, an FPGA.

The signal generator 206 detects the impedance (electric impedance) of the vibrator 1. Specifically, the signal generator 206 measures the impedance of the vibrator 1 in a state where the elastic wave is excited (in a vibrating state). The signal generator 206 acquires the voltage input to the vibrator 1 based on the output AC signal. The signal generator 206 acquires the current input to the vibrator 1 based on the detection signal output by the detector 5. The signal generator 206 measures the impedance of the vibrator 1 based on the acquired current and voltage input to the vibrator 1. The signal generator 206 transmits the measured impedance of the vibrator 1 to the control unit 204.

The control unit 204 controls each unit of the defect inspection device 200 similarly to the control unit 4 according to the first embodiment. The control unit 204 excites the vibrator 1 with a plurality of frequencies by controlling the signal generator 206. The control unit 204 acquires the impedance of the vibrator 1 measured by the signal generator 206 for the plurality of frequencies. Here, in a case where the vibrator 1 is vibrated at the resonance frequency of the measurement system including the vibrator 1 and the inspection target P, the impedance of the vibrator 1 becomes a minimal value. That is, the displacement of the inspection target P becomes large at a frequency (resonance frequency) at which the impedance becomes small. The displacement of the inspection target P becomes small at a frequency where the impedance becomes large. In the second embodiment, the control unit 204 is configured to acquire, as the vibration state information, the impedance of the vibrator 1 measured by the signal generator 206 for the plurality of frequencies based on the voltage input to the vibrator 1 and the current input to the vibrator 1.

The control unit 204 extracts the recommended frequencies F from among the plurality of frequencies based on the acquired vibration state information (impedance of the vibrator 1) for the plurality of frequencies. Specifically, the control unit 204 extracts, as the recommended frequency F (resonance frequency) recommended for measurement, the frequency at which the impedance of the vibrator 1 becomes the minimal value from among the acquired plurality of frequencies.

Other configurations of the second embodiment are the same as those of the first embodiment.

Effects of Second Embodiment

In the second embodiment, the following effects can be obtained.

In the second embodiment, as described above, the control unit 204 is configured to acquire, as the vibration state information, the impedance of the vibrator 1 measured for the plurality of frequencies based on the voltage input to the vibrator 1 (excitation unit) and the current input to the vibrator 1. Here, the frequency at which the impedance of the vibrator 1 becomes a minimal value is a frequency at which the input electric energy is efficiently converted into the vibration energy in the vibrator 1. Thus, as in the second embodiment, when the impedance of the vibrator 1 measured based on the voltage input to the vibrator 1 and the current input to the vibrator 1 is configured to be acquired as the vibration state information, the frequency at which the impedance of the vibrator 1 becomes the minimal value can be extracted as the recommended frequency F for performing the defect inspection by measuring the impedance of the vibrator 1. Thus, it is possible to easily acquire the frequency (the frequency suitable for measurement by the laser interference method) capable of efficiently exciting the elastic wave in the inspection target P by measuring the impedance of the vibrator 1. As a result, the recommended frequencies F which are frequencies suitable for measurement can be easily acquired without repeating the measurement of the inspection target P by the laser interference method and the determination of the measurement result.

Other effects of the second embodiment are the same as those of the first embodiment.

Third Embodiment

Next, a configuration of a defect inspection device 300 according to a third embodiment of the present invention will be described with reference to FIGS. 10 and 11. The third embodiment is different from the first embodiment in that the recommended frequencies F are extracted by sequentially changing the frequency of the excitation vibration caused by the vibrator 1 in a predetermined band in order to excite the elastic wave in the inspection target P, and has the configuration in which the band for changing the frequency of the excitation vibration caused by the vibrator 1 in order to excite the elastic wave in the inspection target P is changed so as to correspond to the type of the defect to be measured which is acquired in advance. The same configurations as those of the first and second embodiments are shown with the same reference signs in the drawings, and the description thereof will be omitted.

Figure 10:
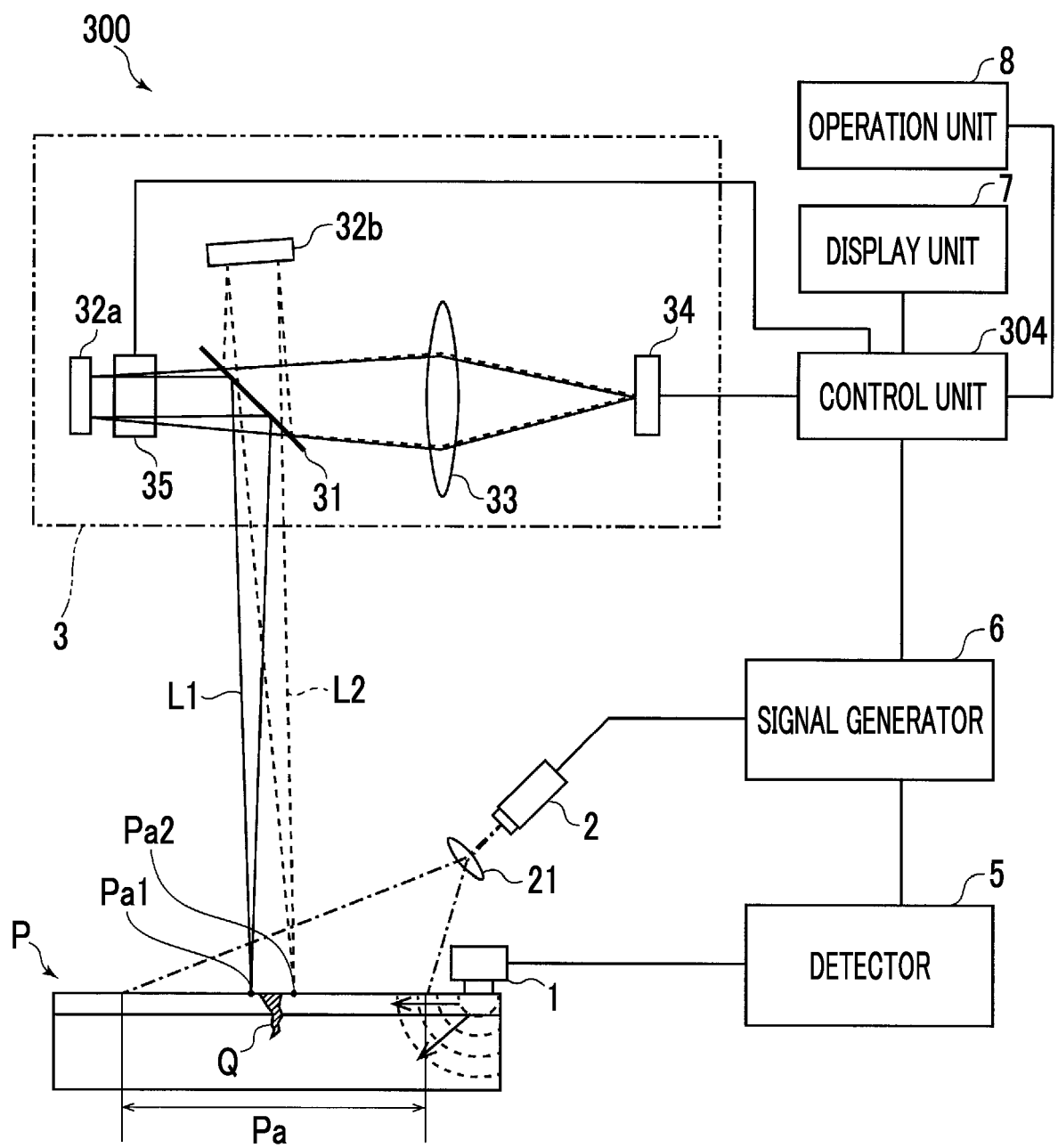
FIG. 10 is a diagram for describing a configuration of a defect inspection device according to a third embodiment.

As shown in FIG. 10, a defect inspection device 300 according to the third embodiment includes a control unit 304.

The control unit 304 controls each unit of the defect inspection device 300 similarly to the control unit 4 according to the first embodiment. The control unit 304 is configured to extract the recommended frequencies F by sequentially changing the frequency of the excitation vibration (the frequency of the elastic wave excited in the inspection target P) caused by the vibrator 1 in a predetermined band in order to excite the elastic wave in the inspection target P, and is configured to change the band for changing the frequency of the excitation vibration (the frequency of the elastic wave excited in the inspection target P) caused by the vibrator 1 in order to excite the elastic wave in the inspection target P so as to correspond to the type of the defect of the inspection target P.

Specifically, the control unit 304 acquires the type of the defect to be detected in order to start the defect inspection in advance. The control unit 304 changes (sets) the band for changing the frequency of the excitation vibration (the frequency of the elastic wave) caused by the vibrator 1 so as to correspond to the acquired type of the defect of the inspection target P. The control unit 304 acquires the vibration state information for the plurality of frequencies in the set band by sequentially changing the frequency of the elastic wave in the band set to correspond to the type of the defect. The control unit 304 extracts the recommended frequencies F from among the plurality of frequencies in the set band. The band for changing the frequency of the elastic wave may be changed (set) based on an input operation of the inspection worker.

Figure 11:
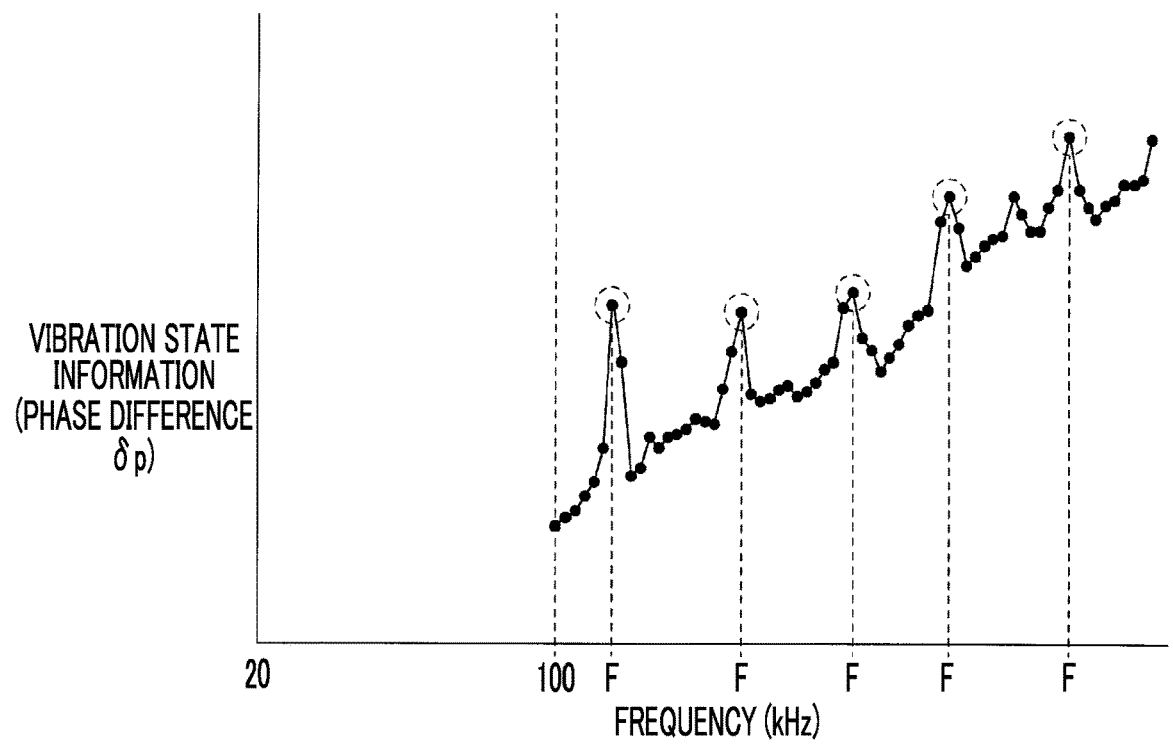
FIG. 11 is a diagram for describing a change in a band for changing a frequency according to the third embodiment.

For example, as shown in FIG. 11, in the defect inspection device 300 configured to be able to acquire the vibration state information for a frequency of 20 kHz or more and 400 kHz or less, in order to detect the measured defect which is acquired in advance, in a case where it is necessary to perform measurement by an elastic wave of a frequency of 100 kHz or more, the control unit 304 changes (sets) the band for changing the frequency of the elastic wave excited in the inspection target P to 100 kHz or more in order to acquire the vibration state information. That is, the control unit 304 sets the band of the frequency for measurement so as to correspond to the type of the defect acquired in advance. The control unit 304 acquires the vibration state information while sequentially changing (sweeping) the frequency in the band of the frequency set to correspond to the type of the defect.

Other configurations of the third embodiment are the same as those of the first embodiment.

Effects of Third Embodiment

In the third embodiment, the following effects can be obtained.

In the third embodiment, as described above, the control unit 304 is configured to extract the recommended frequencies F by sequentially changing the frequency of the excitation vibration caused by the vibrator 1 (excitation unit) in a predetermined band in order to excite the elastic wave in the inspection target P, and is configured to change the band for changing the frequency of the elastic wave so as to correspond to the type of the defect of the inspection target P. Here, the band of the frequency of the elastic wave suitable for the defect inspection differs depending on the type of the defect of the inspection target P to be detected (for example, cracks, peeling, or the like of the coating film). Thus, it is possible to specify the band of the frequency of the elastic wave suitable for detecting the specified type of the defect by specifying the type of the defect to be detected in advance. In consideration of the above point, in the third embodiment, the band for changing the frequency of the elastic wave excited in the inspection target P (the band for changing the frequency of the excitation vibration caused by the vibrator 1) is changed so as to correspond to the type of the defect of the inspection target P. With this configuration, it is possible to limit the band of the frequency to be changed so as to correspond to the type of the defect. Thus, it is possible to omit control for acquiring the phase difference $\delta_p$ while changing the frequency for the band of the frequency that is not necessary for inspecting the defect. Thus, it is possible to suppress an increase in an inspection time for acquiring unnecessary information by performing the control for acquiring the phase difference $\delta_p$ for the unnecessary band.

Other effects of the third embodiment are the same as those of the first and second embodiments.

MODIFICATION EXAMPLES

The embodiments disclosed this time are illustrated in all respects and are not considered to be restrictive. The scope of the present invention is shown by the claims rather than the description of the above-described embodiments, and further includes all changes (modification examples) within the meaning and scope equivalent to the claims.

Figure 12:
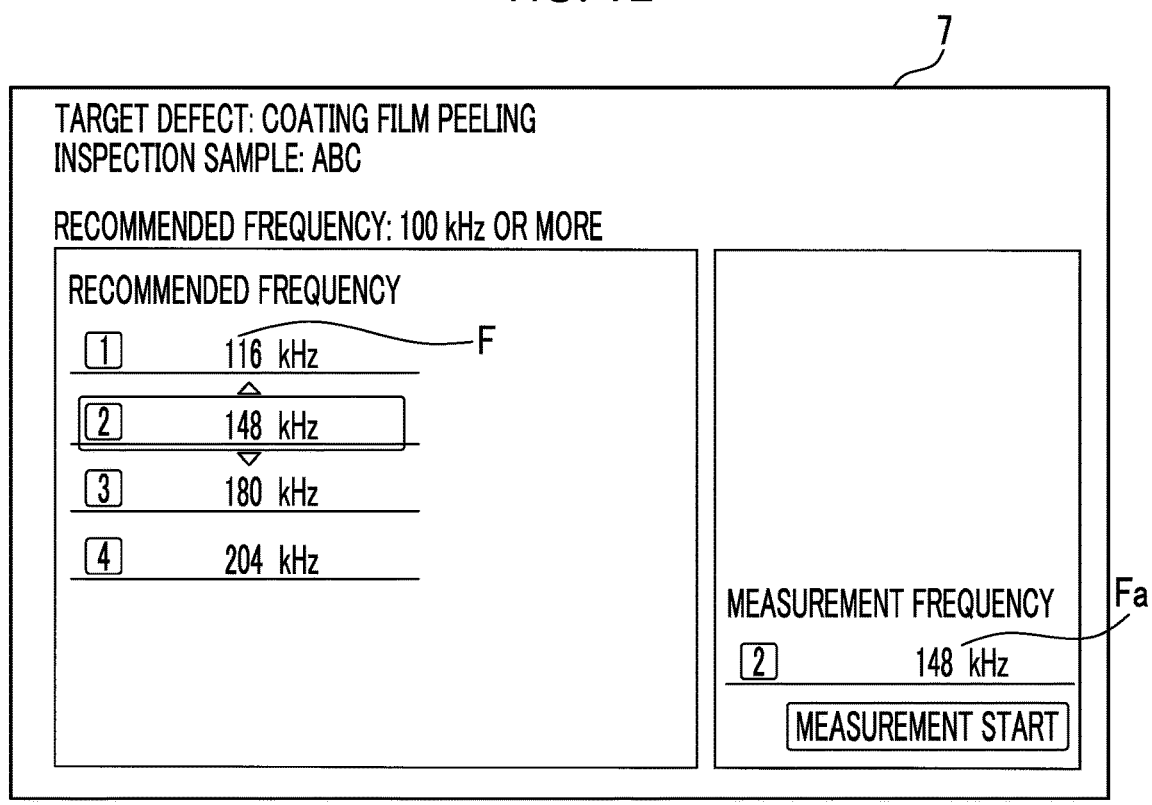
FIG. 12 is a diagram for describing display of a recommended frequency according to modification examples of the first to third embodiments.

For example, in the first to third embodiments, although the control unit is configured to display the extracted recommended frequencies in an identifiable manner, the present invention is not limited thereto. For example, the control unit may be configured such that the extracted recommended frequencies are not displayed in an identifiable manner. That is, only a graph representing a relationship between the phase difference and the frequency may be displayed. The extracted recommended frequencies and the frequency from which the vibration state information is acquired may be displayed side by side instead of being in an identifiable state. As shown in FIG. 12, only the extracted recommended frequencies may be displayed.

In the first to third embodiments, although the control unit is configured to display the measurement frequency to be used for the measurement in a selectable manner from among the extracted recommended frequencies, the present invention is not limited thereto. For example, the control unit selects the measurement frequency from among the recommended frequencies without displaying the measurement frequency to be selectable, and thus, the measurement may be configured to be started by using the selected measurement frequency.

In the first and third embodiments, although the control unit is configured to acquire the vibration state information for the plurality of frequencies based on the phase difference between the voltage input to the vibrator (excitation unit) and the current input to the vibrator, the present invention is not limited thereto. For example, an active power of the vibrator may be acquired as the vibration state information.

In the first and third embodiments, although the control unit is configured to acquire the vibration state information based on the phase difference between the voltage pulse signal in which the voltage input to the vibrator (excitation unit) is converted into the pulse signal and the current pulse signal in which the current input to the vibrator is converted into the pulse signal and is configured to extract, as the recommended frequency, the frequency at which the phase difference between the voltage pulse signal and the current pulse signal becomes the maximal (extreme value) from among the plurality of frequencies, the present invention is not limited thereto. For example, the vibration state information may be acquired by measuring the phase difference between the current and the voltage input to the vibrator without converting the current and the voltage input to the vibrator into the pulse signal. The frequency at which the phase difference between the current and the voltage input to the vibrator becomes the minimal value is not extracted as the recommended frequency, and the frequency at which the phase difference between the current and the voltage input to the vibrator is smaller than a predetermined value may be extracted as the recommended frequency.

In the first and third embodiments, although the control unit is configured to convert the voltage input to the vibrator (excitation unit) into the pulse signal and delays the phase by π/2 to generate the voltage pulse signal and is configured to extract, as the recommended frequency, the frequency at which the phase difference between the voltage pulse signal and the current pulse signal becomes the maximal, the present invention is not limited thereto. For example, the voltage may be converted into the pulse signal to generate the voltage pulse signal without delaying the phase, and the frequency at which the phase difference between the voltage pulse signal and the current pulse signal becomes the minimal may be extracted as the recommended frequency.

In the second embodiment, although the control unit is configured to acquire, as the vibration state information, the impedance of the vibrator measured for the plurality of frequencies based on the voltage input to the vibrator (excitation unit) and the current input to the vibrator, the present invention is not limited thereto. For example, an amplitude of the elastic wave excited in the inspection target may be acquired as the vibration state information for the plurality of frequencies, and thus, the frequency at which the amplitude of the elastic wave becomes large may be acquired as the recommended frequency.

In the second embodiment, although the impedance of the vibrator is acquired based on the current detected by the detector and the voltage input to the vibrator by the signal generator, the present invention is not limited thereto. For example, the impedance of the vibrator may be directly measured by connecting an impedance measurement device for measuring the impedance to the vibrator. The frequency at which the active power of the vibrator becomes large may be extracted as the recommended frequency by connecting a wattmeter and measuring the active power of the vibrator instead of the impedance of the vibrator.

In the third embodiment, although the control unit is configured to extract the recommended frequency by sequentially changing the frequency of the excitation vibration caused by the vibrator (excitation unit) in a predetermined band in order to excite the elastic wave in the inspection target and is configured to change the band for changing the frequency of the elastic wave so as to correspond to the type of the defect to be inspected, but the present invention is not limited thereto. For example, the control unit may be configured so as not to change the band for changing the frequency of the elastic wave. The control unit may be configured to change the band for changing the frequency based on an input operation of the inspection worker regardless of the type of the defect.

In the first embodiment, although the step of displaying the extracted recommended frequencies again in an identifiable manner is provided after the step of measuring the interfered laser lights, the present invention is not limited thereto. For example, the control unit may include a step of starting the measurement again with a recommended frequency separate from the frequency used for the measurement after the step of measuring the interfered laser lights. Alternatively, the control of the defect inspection device may be ended after the step of measuring the interfered laser lights.

In the first to third embodiments, although a specific numerical value of the extracted recommended frequency is displayed on the display unit, but the present invention is not limited thereto. For example, the recommended frequencies may be displayed in an identifiable manner without displaying the specific numerical value of the recommended frequency by giving a mark on the graph representing the relationship between each of the plurality of frequencies and the phase difference between the voltage and current input to the vibrator (excitation unit).

In the first to third embodiments, although the graph representing the relationship between each of the plurality of frequencies and the phase difference between the voltage and the current input to the vibrator (excitation unit) is displayed on the display unit, the present invention is not limited thereto. Instead of the graph, the displayed recommended frequencies may be displayed in a color-coded manner, and thus, the magnitude of the phase difference can be recognized by a color chart.

In the first to third embodiments, although the interfered laser lights are measured by using the speckle shearing interferometer, the present invention is not limited thereto. For example, a Michelson interferometer may be used.

In the first to third embodiments, although the vibration state information is acquired as the plurality of frequencies for acquiring the vibration state information for 200 frequencies, the present invention is not limited thereto. For example, at least two frequencies may be acquired as the plurality of frequencies.

In the first to third embodiments, although the vibration state information is acquired while the frequency of the elastic wave excited in the inspection target is sequentially changed in the predetermined band, the present invention is not limited thereto. For example, instead of sweeping (sequential changing), the vibration state information may be acquired while the frequency is randomly changed.

In the first to third embodiments, although the vibrator is used as an example of the excitation unit that excites the elastic wave in the inspection target, the present invention is not limited thereto. For example, the elastic wave may be excited by a loudspeaker that emits sound.

In the first to third embodiments, although electrical characteristic information is configured to be acquired as the vibration state information for the plurality of frequencies based on the voltage input to the vibrator (excitation unit) and the current input to the vibrator, the present invention is not limited thereto. For example, the configured unit may be configured to acquire, as the vibration state, mechanical characteristic information such as displacement and sound pressure caused in the vibrator and the inspection target. In this case, a measurement unit that measures the mechanical characteristic information may be provided in the control unit.

Aspects

It will be understood by those skilled in the art that the above illustrative embodiments are specific examples of the following aspects.

Item 1

A defect inspection device includes an excitation unit that excites an elastic wave in an inspection target, an irradiation unit that irradiates a measurement region of the inspection target with laser lights, a measurement unit that causes the laser lights reflected in the measurement region to interfere with each other by a laser interference method, and measures the interfered laser lights, and a control unit that acquires vibration state information which is information about a state of the elastic wave excited in the inspection target for a plurality of frequencies by changing a frequency of excitation vibration caused by the excitation unit in order to excite the elastic wave in the inspection target, and extracts recommended frequencies recommended for inspecting a defect of the inspection target from among the plurality of frequencies based on the acquired vibration state information for the plurality of frequencies.

Item 2

In the defect inspection device according to item 1, the control unit is configured to display the extracted recommended frequencies in an identifiable manner.

Item 3

In the defect inspection device according to item 2, the control unit is configured to display a measurement frequency to be used for measurement in a selectable manner from among the extracted recommended frequencies.

Item 4

In the defect inspection device according to any one of items 1 to 3, the control unit is configured to acquire the vibration state information for the plurality of frequencies based on a phase difference between a voltage input to the excitation unit and a current input to the excitation unit.

Item 5

In the defect inspection device according to item 4, the control unit is configured to acquire the vibration state information based on a phase difference between a voltage pulse signal in which the voltage input to the excitation unit is converted into a pulse signal and a current pulse signal in which the current input to the excitation unit is converted into a pulse signal, and is configured to extract, as the recommended frequency, a frequency at which the phase difference between the voltage pulse signal and the current pulse signal becomes an extreme value from among the plurality of frequencies.

Item 6

In the defect inspection device according to any one of items 1 to 3, the control unit is configured to acquire, as the vibration state information, an impedance of the excitation unit measured based on the voltage input to the excitation unit and the current input to the excitation unit for the plurality of frequencies.

Item 7

In the defect inspection device according to any one of items 1 to 6, the control unit is configured to extract the recommended frequency by sequentially changing the frequency of the excitation vibration caused by the excitation unit in a predetermined band in order to excite the elastic wave in the inspection target, and is configured to change a band for changing a frequency of the elastic wave so as to correspond to a type of the defect of the inspection target.

Item 8

A defect inspection method includes a step of exciting an elastic wave in an inspection target, a step of irradiating a measurement region of the inspection target with laser lights, a step of causing the laser lights reflected in the measurement region to interfere with each other by a laser interference method and measuring the interfered laser lights, and a step of acquiring vibration state information which is information about a state of the elastic wave excited in the inspection target for a plurality of frequencies by changing a frequency of excitation vibration caused in order to excite the elastic wave in the inspection target, and extracting recommended frequencies recommended for inspecting a defect of the inspection target from among the plurality of frequencies based on the acquired vibration state information for the plurality of frequencies.

Item 9

The defect inspection method according to item 8 further includes a step of displaying the extracted recommended frequencies in an identifiable manner.

Item 10

The defect inspection method according to claim 9 further includes a step of displaying the extracted recommended frequencies again in an identifiable manner after the step of measuring the interfered laser lights.

The invention claimed is:

1. A defect inspection device comprising:
   an excitation unit that excites an elastic wave in an inspection target;
   a control unit that acquires vibration state information which is information about a state of the elastic wave excited in the inspection target for a plurality of frequencies by changing a frequency of excitation vibration caused by the excitation unit in order to excite the elastic wave in the inspection target, and extracts recommended frequencies recommended for inspecting a defect of the inspection target from among the plurality of frequencies based on the acquired vibration state information for the plurality of frequencies;
   an irradiation unit that irradiates a measurement region of the inspection target with laser lights in a state of exciting the elastic wave in the inspection target by the excitation unit; and
   a measurement unit that causes the laser lights reflected in the measurement region to interfere with each other by a laser interference method, and measures the interfered laser lights.

2. The defect inspection device according to claim 1, wherein the control unit is configured to display the extracted recommended frequencies in an identifiable manner.

3. The defect inspection device according to claim 2, wherein the control unit is configured to display a measurement frequency to be used for measurement in a selectable manner from among the extracted recommended frequencies.

4. The defect inspection device according to claim 1, wherein the control unit is configured to acquire the vibration state information for the plurality of frequencies based on a phase difference between a voltage input to the excitation unit and a current input to the excitation unit.

5. The defect inspection device according to claim 4, wherein the control unit is configured to acquire the vibration state information based on a phase difference between a voltage pulse signal in which the voltage input to the excitation unit is converted into a pulse signal and a current pulse signal in which the current input to the excitation unit is converted into a pulse signal, and is configured to extract, as the recommended frequency, a frequency at which the phase difference between the voltage pulse signal and the current pulse signal becomes an extreme value from among the plurality of frequencies.

6. The defect inspection device according to claim 1, wherein the control unit is configured to acquire, as the vibration state information, an impedance of the excitation unit measured based on the voltage input to the excitation unit and the current input to the excitation unit for the plurality of frequencies.

7. The defect inspection device according to claim 1, wherein the control unit is configured to extract the recommended frequency by sequentially changing the frequency of the excitation vibration caused by the excitation unit in a predetermined band in order to excite the elastic wave in the inspection target, and is configured to change a band for changing a frequency of the elastic wave so as to correspond to a type of the defect of the inspection target.

8. The defect inspection device according to claim 1,
   the control unit then generates a defect inspection image of the defect of the inspection target based on the interfered laser lights measured by the measuring unit.

9. A defect inspection method comprising:
   exciting an elastic wave in an inspection target;
   acquiring vibration state information which is information about a state of the elastic wave excited in the inspection target for a plurality of frequencies by changing a frequency of excitation vibration caused in order to excite the elastic wave in the inspection target and extracting recommended frequencies recommended for inspecting a defect of the inspection target from among the plurality of frequencies based on the acquired vibration state information for the plurality of frequencies;
   irradiating a measurement region of the inspection target with laser lights with an irradiation unit in a state of exciting the elastic wave in the inspection target, and
   causing the laser lights reflected in the measurement region to interfere with each other by a laser interference method, and measuring the interfered laser lights.

10. The defect inspection method according to claim 9, further comprising:
    displaying the extracted recommended frequencies in an identifiable manner.

11. The defect inspection method according to claim 10, further comprising:
    displaying the extracted recommended frequencies again in an identifiable manner after measuring the interfered laser lights.

* * * * *